US010666059B2

(12) United States Patent
Fuchs et al.

(10) Patent No.: US 10,666,059 B2
(45) Date of Patent: May 26, 2020

(54) SYSTEMS, APPARATUS, AND METHODS FOR CONTROLLING GENERATING ASSETS, FLEXIBLE LOADS AND/OR STORAGE ASSETS TO SUPPORT DYNAMIC REGULATION

(71) Applicant: Siemens Aktiengesellschaft, München (DE)

(72) Inventors: Erich Fuchs, Mödling (AT); Manfred Jendrosch, Saint John (CA)

(73) Assignee: SIEMENS AKTIENGESELLSCHAFT, München (DE)

( * ) Notice: Subject to any disclaimer, the term of this patent is extended or adjusted under 35 U.S.C. 154(b) by 127 days.

(21) Appl. No.: 15/680,361

(22) Filed: Aug. 18, 2017

(65) Prior Publication Data

US 2019/0058331 A1 Feb. 21, 2019

(51) Int. Cl.
*H02J 3/38* (2006.01)
*H02J 3/46* (2006.01)
*G05B 15/02* (2006.01)
*G06Q 10/06* (2012.01)
*G06Q 50/06* (2012.01)

(52) U.S. Cl.
CPC ............ *H02J 3/46* (2013.01); *G05B 15/02* (2013.01); *G06Q 10/06* (2013.01); *G06Q 50/06* (2013.01); *H02J 3/382* (2013.01)

(58) Field of Classification Search
CPC . H02J 3/46; H02J 3/382; G06Q 50/06; G06Q 15/02; G06Q 10/06
See application file for complete search history.

(56) References Cited

U.S. PATENT DOCUMENTS

| | | | | |
|---|---|---|---|---|
| 8,588,991 | B1* | 11/2013 | Forbes, Jr. | G05B 19/02 700/295 |
| 2008/0040263 | A1* | 2/2008 | Pollack | G06Q 20/10 705/39 |
| 2011/0276194 | A1 | 11/2011 | Emalfarb et al. | |
| 2012/0029897 | A1 | 2/2012 | Cherian et al. | |
| 2013/0293021 | A1 | 11/2013 | Varma et al. | |
| 2014/0018969 | A1* | 1/2014 | Forbes, Jr. | H02J 3/32 700/295 |
| 2014/0277808 | A1 | 9/2014 | Irisarri et al. | |
| 2014/0379152 | A1 | 12/2014 | Chen et al. | |

(Continued)

OTHER PUBLICATIONS

Ciprian Vlad, Marian Barbu and Ramon Vilanova "Intelligent Control of a Distributed Energy Generation System Based on Renewable Sources" ; Published: Aug. 4, 2016; pp. 1-23.

(Continued)

*Primary Examiner* — M. N. Von Buhr

(57) ABSTRACT

Embodiments provide for controlling a power generation system that includes a plurality of power generating assets; and an energy management system including a controller in communication with the assets and configured to control operation of the assets. The controller is operative to assign the assets to a regulation pool; determine an effective control mode for each asset; and control the assets based on the determined effective control mode of each asset. The effective control mode for each asset is calculated based upon an asset pool control mode. Numerous additional aspects are disclosed.

17 Claims, 7 Drawing Sheets

(56) References Cited

U.S. PATENT DOCUMENTS

| | | | | |
|---|---|---|---|---|
| 2015/0012146 | A1* | 1/2015 | Cherian | H02J 3/00 |
| | | | | 700/291 |
| 2015/0134131 | A1* | 5/2015 | Carralero | G06F 1/26 |
| | | | | 700/286 |
| 2015/0380937 | A1* | 12/2015 | Forbes, Jr. | G05B 15/02 |
| | | | | 700/295 |
| 2016/0370819 | A1* | 12/2016 | Forbes, Jr. | G06Q 10/06 |
| 2017/0140480 | A1* | 5/2017 | Seely | G06Q 50/06 |
| 2017/0201464 | A1* | 7/2017 | Yoo | H04L 47/70 |
| 2017/0227978 | A1* | 8/2017 | Kudo | H02J 3/32 |
| 2017/0300019 | A1* | 10/2017 | Blackhall | G06Q 50/06 |
| 2019/0020196 | A1* | 1/2019 | Poon | H02J 3/32 |
| 2019/0020220 | A1* | 1/2019 | Lian | H02J 13/0017 |

OTHER PUBLICATIONS

Charles F. Mason and Remi Morin Chasse "An Economic Simulation of the Path to Sustainable Energy: A Dynamic Analysis"; Challenges in Sustainability|2017|vol. 5|Issue 2| pp. 1-10.

* cited by examiner

SYSTEMS, APPARATUS, AND METHODS FOR CONTROLLING GENERATING ASSETS, FLEXIBLE LOADS AND/OR STORAGE ASSETS TO SUPPORT DYNAMIC REGULATION

FIELD

The present embodiments relate to operating energy systems, and more specifically to systems, apparatus, and methods for controlling generating assets, flexible loads and/or storage assets to support dynamic regulation.

BACKGROUND

Regulation pools are organized markets for trading in electricity commodities and services. Regulation pools are created to maximize competition in generation, to compete on price, and to be open to all market participants. Regulation includes the process by which decisions get made, implemented and enforced as well as how authorities review and change the decisions of regulation pool managers. Electricity generating assets such as diesel generators, gas turbines, wind turbines, etc. are assigned to regulation pools to fulfill commitments. However, the various types of assets operate differently than each other and thus, present challenges when energy production systems include multiple different types of assets. Therefore, what is needed are systems, apparatus, and methods for controlling different types of generating assets to support dynamic regulation.

SUMMARY

In some embodiments, a power generation system is provided. The system includes a plurality of power generating assets; a power transmission network coupling the assets to loads; and an energy management system including a controller in communication with the assets and configured to control operation of the assets. The controller is operative to assign the assets to a regulation pool; determine an effective control mode for each asset; and control the assets based on the determined effective control mode of each asset. The effective control mode for each asset is calculated based upon an asset pool control mode. In at least one embodiment, the power generation system includes a plurality of power consuming loads coupled to the power generating assets, and the controller of the energy management system is operative to control the assets based on the determined effective control mode of each asset to meet requirements of the power consuming loads.

In some other embodiments, a method of controlling a power generation system is provided. The method includes assigning a plurality of power generating assets to a regulation pool; determining an effective control mode for each asset; and controlling the assets based on the determined effective control mode of each asset to meet requirements of a plurality of power consuming loads coupled to the power generating assets. Determining the effective control mode for each asset includes calculating the effective control mode based upon an asset pool control mode.

In yet other embodiments, a controller for a power generation system is provided. The controller includes a processor; a memory coupled to the processor and storing instructions executable on the processor. The instructions are operative to assign a plurality of power generating assets to a regulation pool; determine an effective control mode for each asset; and control the assets based on the determined effective control mode of each asset to meet requirements of a plurality of power consuming loads coupled to the power generating assets. The instruction to determine the effective control mode for each asset includes an instruction to calculate the effective control mode based upon an asset pool control mode.

Still other features, aspects, and advantages of embodiments will become more fully apparent from the following detailed description, the appended claims, and the accompanying drawings by illustrating a number of exemplary embodiments and implementations, including the best mode contemplated for carrying out the embodiments. Embodiments may also be capable of other and different applications, and several details may be modified in various respects, all without departing from the spirit and scope of the disclosed embodiments. Accordingly, the drawings and descriptions are to be regarded as illustrative in nature, and not as restrictive. The drawings are not necessarily drawn to scale. The description is intended to cover all modifications, equivalents, and alternatives falling within the spirit and scope of the claims.

DESCRIPTION

Figure 1:
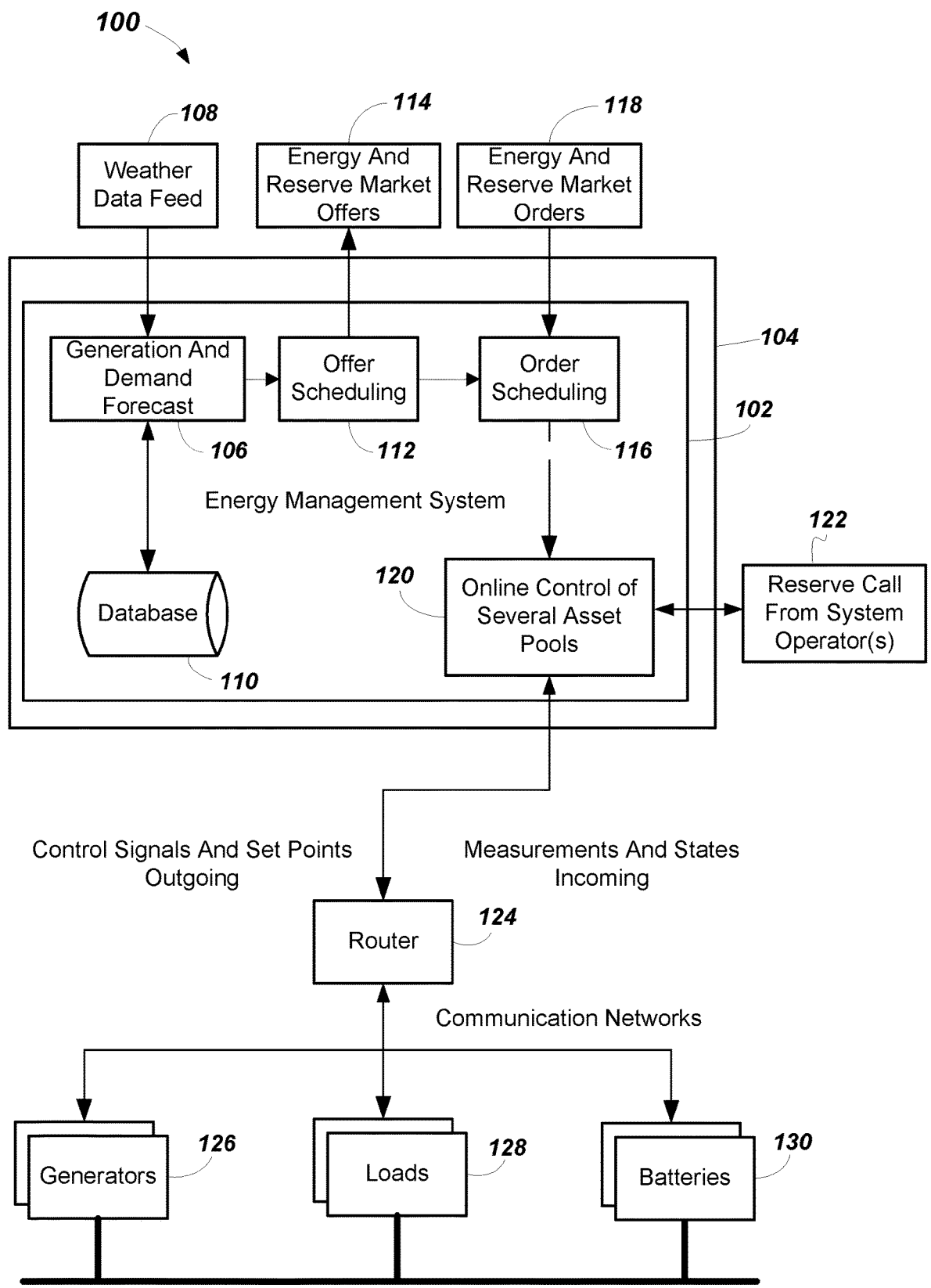
FIG. 1 is a block diagram depicting an example power system according to some embodiments.

Embodiments disclosed herein describe an energy management system (EMS) enhanced to support dynamic regulation of generating assets, flexible loads and/or storage assets. Within the EMS, orders are received from various energy and/or capacity markets. Assets are then assigned to regulation pools to fulfill these commitments. An asset configuration referred to as the Basic Control Mode is used to specify the default state of any particular asset, which is then used by an internal algorithm to determine the Effective Control Mode. This Effective Control Mode value is manipulated in real time to ensure that assets are responsive to the control demands. The various effective control mode options allow for a single regulation pool to contain a mixture of both traditional fuel-based assets as well as renewable assets, responding as appropriate to control stimulus.

The Control Mode Basic is a parameter of an asset, configured by an end user. This setting is used as the default value in the absence of externally demanded control. There are various options, which are used by the control module to determine the availability of the asset for real time control. These options allow an operator to set the asset into testing mode, supervision only mode, manual control mode or active control mode. Variations of these settings can be used to indicate whether assets can be controlled during a reserve call.

The effective control mode is a system calculated control mode for an asset, which is used by the system when controlling individual assets. The algorithm to determine the effective control mode uses the initial control mode basic, along with other attributes of the asset, such as communication and disturbance status, whether it has been successfully marketed within a reserve market and whether a reserve call is currently active. Once the assets effective control mode is calculated, the EMS application can determine how best to control the asset given the current state.

An example of the usage of the effective control mode would be the case of an asset that has negative flexibility available and has been successfully marketed on a negative capacity market and therefore exists within a regulation pool supporting negative capacity. If the connection to this asset is lost, the effective control mode is dynamically switched to SUSPENDED. The control module ignores SUSPENDED assets, so when a negative reserve call is activated, the asset mentioned above would not be controlled due to its current effective control mode value. This would force other assets to be controlled in place of this SUSPENDED asset, so the reserve call is still fulfilled.

The concept of a statically configured control mode basic, with a dynamically calculated effective control mode provides for substantial flexibility within the configuration of the application. Regulation pools can be configured to support multiple varied markets and contain a mixture of asset types. Both traditional assets and renewable assets can exist within a regulation pool supporting energy markets, as well as capacity markets. When reserve calls are executed against the regulation pool, the controllable and available assets will respond to the reserve call, however, any assets that are in supervisory or schedule mode only will continue to fulfill their energy market obligation.

The calculation for the behavior of "upgrading" assets from e.g., basic control mode supervisory to effective control mode "control" takes place independently of the overall asset pool parameter control mode—which is e.g., "Schedule", "Schedule and reserve", "Reserve relative only".

With this concept, a mixed pool control of traditional fuel fired and renewable assets becomes possible: e.g., a renewable asset shall produce (fluctuating) as much as possible in the absence of a reserve call, a traditional asset shall produce according to its predefined schedule in the absence of a reserve call—but both shall react on a negative reserve call issued by the system operator.

Providing the ability for regulation pools to contain traditional fuel-based assets and renewable assets, contributing in energy markets and capacity markets allows for a diverse set of assets to contribute to various aspects of the regulation pool. Some may be controlled for alignment with the defined energy schedule, some assets may be solely supervised, some assets may be available for reserve and some assets may be unavailable for control for a variety of reasons. The dynamic determination of the effective control mode for each of these assets enables this generalized control, which also allows the regulation pools to be segregated across multiple nodes for processing efficiency. Splitting the total number of available assets across multiple regulation pools, provides for the ability for the system to maintain the regulatory mandated cyclic processing times when the number of assets grows too large.

Turning now to the drawings, FIG. 1 depicts an example of a power system 100 according to various embodiments. The power system 100 includes an energy management system (EMS 102) that executes on one or more networked computer systems 104. The EMS 102 includes a generation and demand forecast module 106 adapted to receive a weather data feed 108 that supplies weather data. The generation and demand forecast module 106 also receives and stores historical information from/to a system database 110. The generation and demand forecast module 106 provides forecast information to an offer scheduling module 112 implemented within the EMS 102. The offer scheduling module 112 in turn outputs energy and reserve market offers 114 to the market and to an order scheduling module 116. The order scheduling module 116 also receives energy and reserve market orders 118. The order scheduling module 116 outputs schedules to a controller 120 operable to effect online control of generating asset pools based on the schedules as well as reserve calls 122 from system operators. The controller 120 outputs control signals and set points via various communication networks (e.g., via a router 124) to generators 126, loads 128, and batteries 130. The controller 120 also receives measurement data and state data from the generators 126, loads 128, and batteries 130. Note that the assets (e.g., the generators 126 and batteries 130) can include a mixture of conventional generators such as diesel and gas fired generators, renewable resources such as solar photovoltaic (PV) and wind turbines, and battery storage systems.

Figure 2:
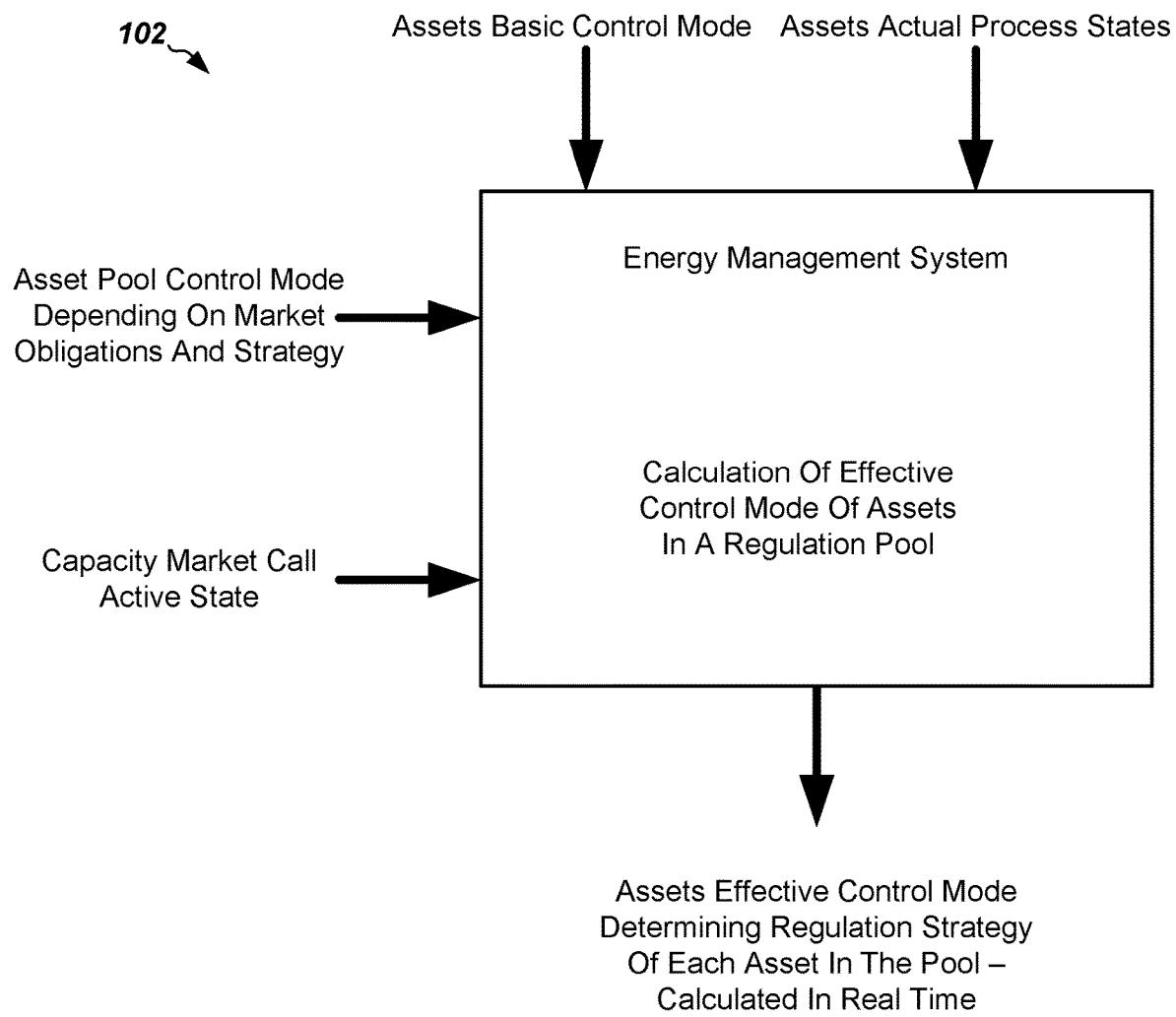
FIG. 2 a simplified block diagram of the inputs and output of an energy management system according to some embodiments.
Figure 3:
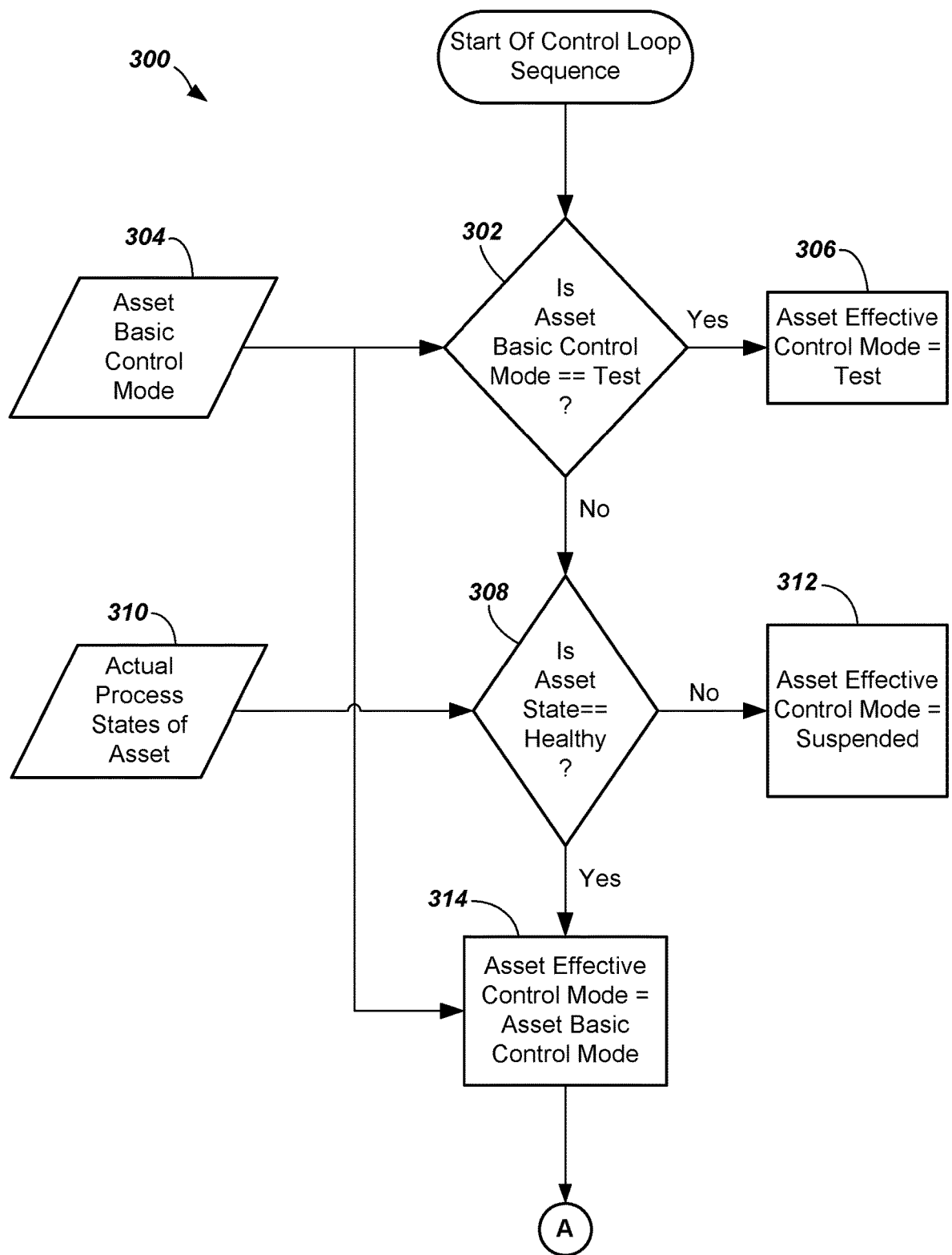
FIGS. 3 through 6 is a flowchart depicting an example of a control loop sequence for an energy management system according to some embodiments.
Figure 4:
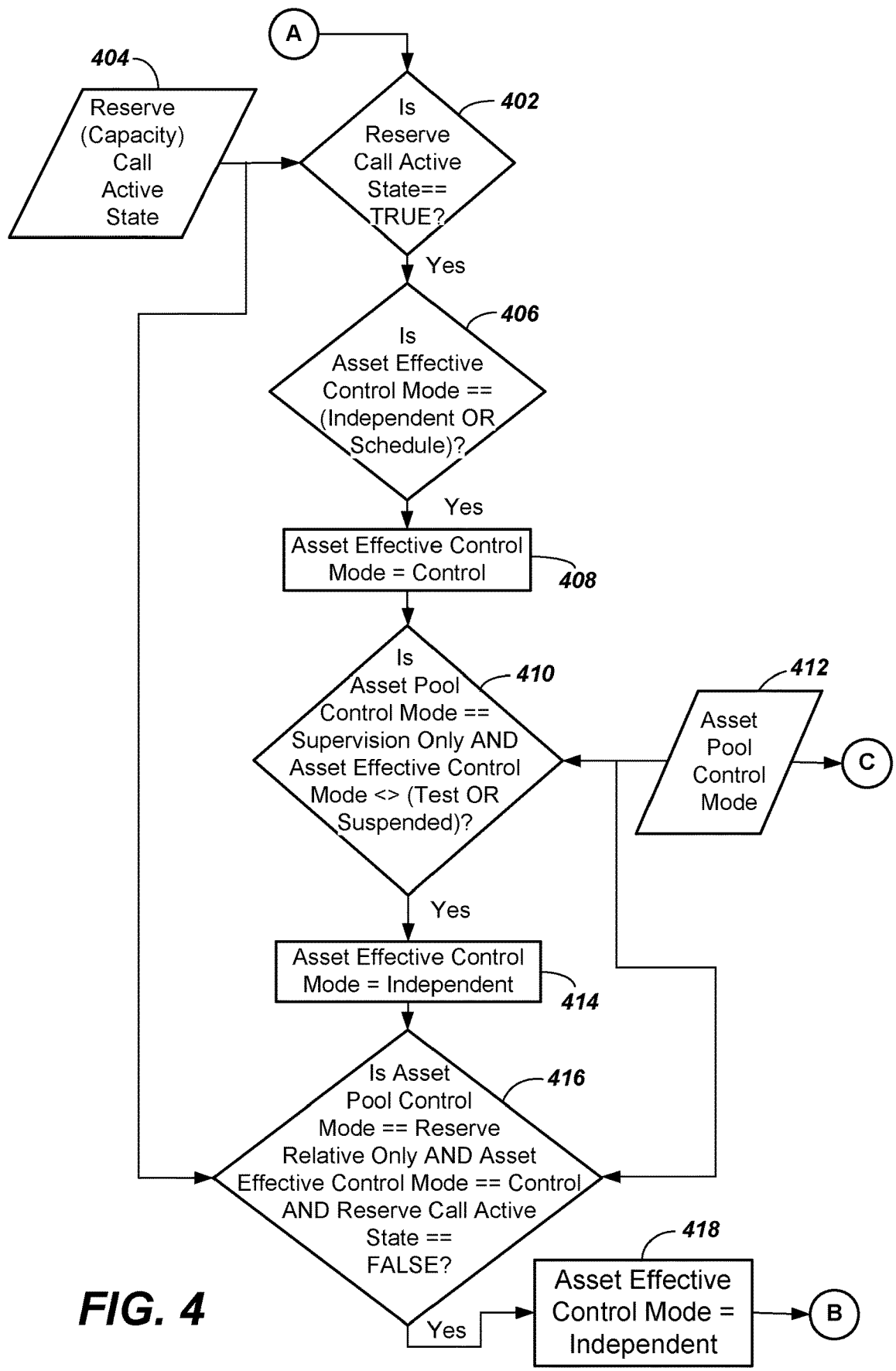
Figure 5:
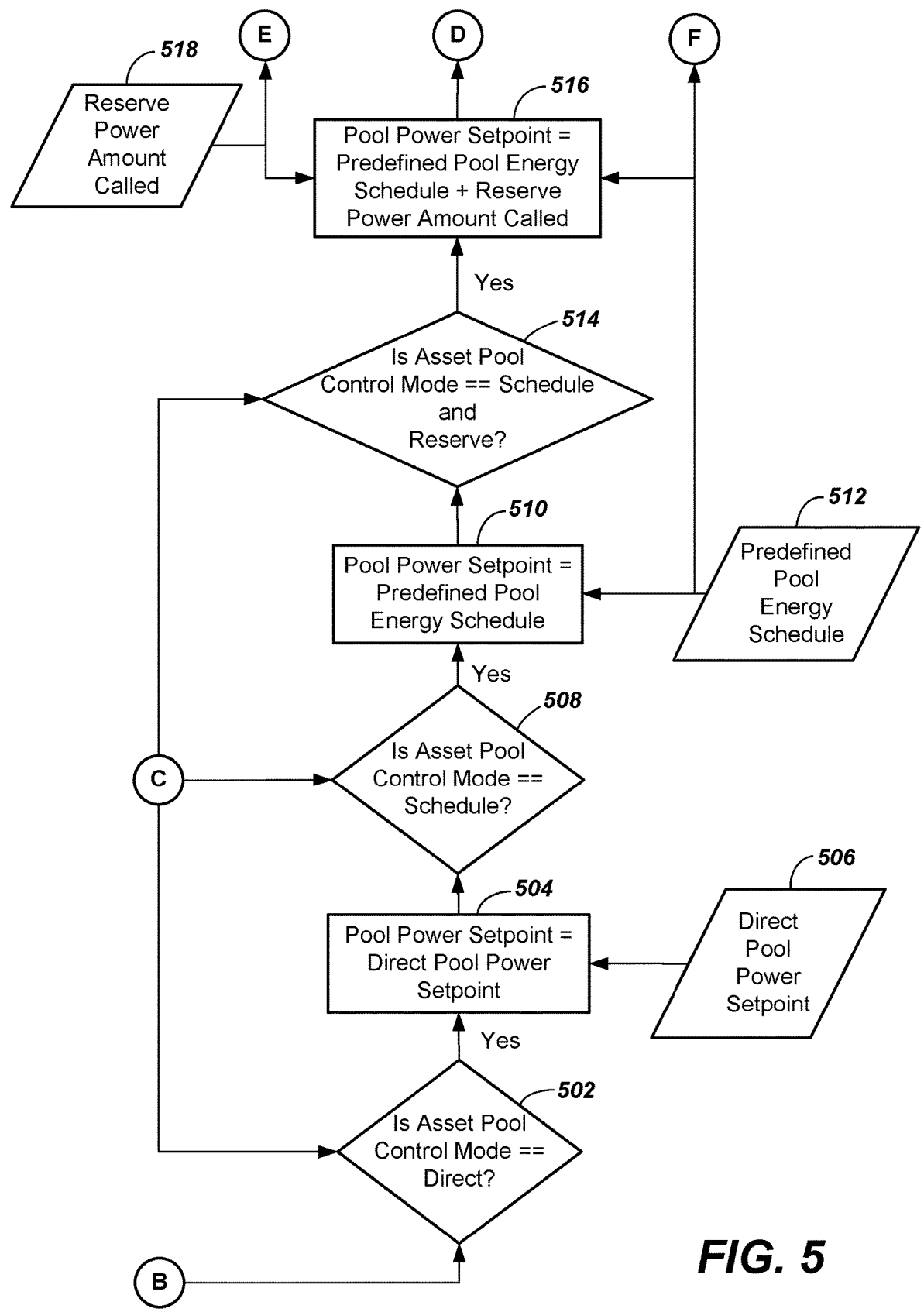
Figure 6:
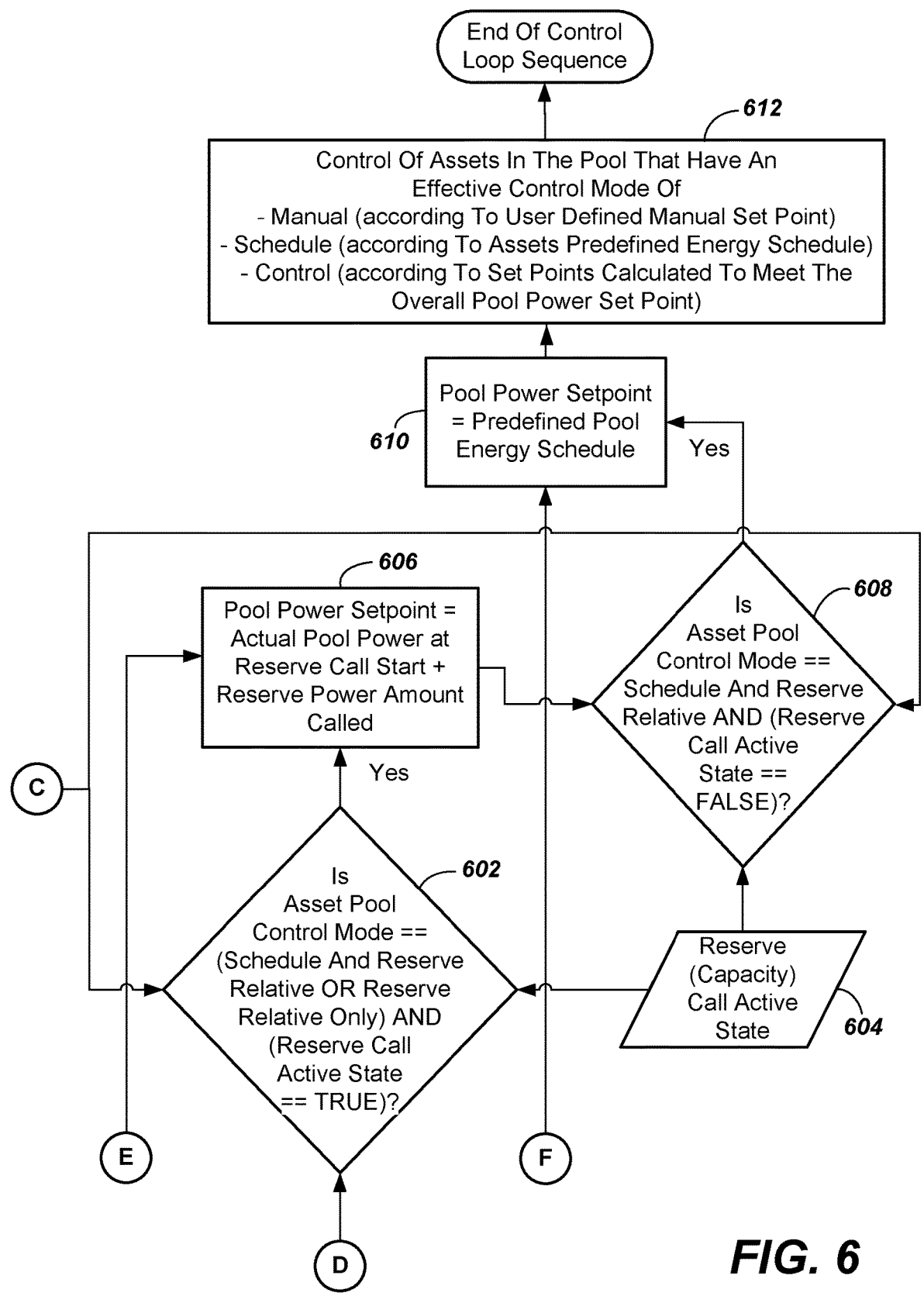

FIG. 2 depicts a simplified block diagram of the inputs and output of an energy management system (EMS 102) according to some embodiments. The inputs include assets basic control mode, assets actual process state, asset pool control mode depending on market obligations and strategy, and capacity market call and active state. The output includes assets effective control mode. This includes determining the regulation strategy of each asset in the regulation pool calculated in real time. Asset pool control modes may include and/or be based on, for example, options for defining an overall strategy for pool regulation, such as identification of available assets and/or how they may be used, identification of predominating assets, or the like. Numerous examples of asset pool control modes are described below.

According to embodiments, variant control modes supporting dynamic regulation provide multiple benefits. Variant control modes allow renewable generation assets to operate at maximum power output possible if the grid frequency is not endangered (e.g., no reserve being called); allow, e.g., flexible demands to consume as needed if the grid frequency is not endangered; allow flexibility regarding how to regulate energy schedule obligations and/or a reserve call issued by a system operator including a mix of renewable and conventional fuel-based generators as well as flexible demands in common regulation pools; and allow reaction to unplanned asset unavailability, e.g., due to communication loss or local constraints and disturbances. The principles can be applied logically in the same way to allow inclusion of battery storage systems in the regulation pools.

The user parameterizes the Basic Control Mode of an asset which is the base for determining dynamically the Effective Control Mode used for regulation. The "Test" basic control mode will force the effective control mode to become "Test" also. This effective control mode will eliminate the asset from the pool power sum and no automatic asset control commands are issued. This can be used, e.g., for testing an asset's control behavior manually prior to any marketing activities.

The "Suspended" basic control mode will force the effective control mode to be "Suspended". This mode leaves the asset in the pool power sum but no automatic control commands will be issued. The asset contributes to the power production obligation of a pool, as it does in any following control mode, but without any control commands being issued in any case.

The "Independent" basic control mode leads to the effective control mode of "Independent" in case of a "healthy" asset and in the absence of a reserve call. The asset contributes to the energy production obligation of a pool without any steering.

In the case that an asset becomes "unhealthy", (i.e., communicates a disturbance, or communicates a local control override or the system detects a communication failure), the effective control mode is "downgraded" to "Suspended" so that the regulation algorithm knows that this asset would currently not be responsive to control signals.

In the case that the asset is part of a pool that also provides reserve (capacity) and the reserve is being called spontaneously by the system operator, the effective control mode gets an "upgrade" to "Control".

The "Manual" control mode is for manual control of an asset. The user sets the desired power production level manually via the user interface (UI) and thus forces the control signal to be sent to the asset. The effective control mode is set to "Manual" also. When this control mode is selected, the asset is not available for fast automatic control actions by the system.

In the case that the asset becomes "unhealthy", the effective control mode becomes "Suspended temporarily".

The "Schedule" basic control mode leads to the effective control mode of "Scheduled" in case of a "healthy" asset and in the absence of a reserve call. The asset contributes to the energy production obligation of a pool and is controlled according to a predefined energy schedule that may change, e.g., every 15 minutes.

In case that the asset becomes "unhealthy" the effective control mode is "downgraded" to "Suspended" so that the regulation algorithm knows that this asset would currently not be responsive to control signals.

In the case that the asset is part of a pool that also provides reserve (capacity) and the reserve is being called spontaneously by the system operator, the effective control mode gets an "upgrade" to "Control".

If the "Control" basic control mode is selected, the asset's effective control mode is set to "Control" in case that the asset is in a "healthy" state. Also, in the absence of a reserve call, the asset will be continuously controlled on a high frequency base to meet the pools power production obligation. In the case that the asset becomes "unhealthy", the effective control mode becomes "Suspended temporarily".

There is an additional condition for an asset being controlled currently to become "unhealthy": if the asset does not follow the control commands issued with the expected power production level measured (applying of course timing and power measurement tolerances in this state detection) the system will set the asset in a non-responsive state temporarily. Also in this case the asset's control mode is effective downgraded to "Suspended".

Turning to FIGS. 3 through 6, a flow chart depicting an example of a control loop sequence 300 for an energy management system according to embodiments is shown. Initially, it is determined if the asset basic control mode is "Test" (302) based on the asset basic control mode (304). If so, the asset effective control mode is set to "TEST" (306). If not, it is determined if the asset state is healthy (308) based on the actual process states of the asset (310). If not, the asset effective control mode is set to "Suspended" (312). If so, the asset effective control mode is set to asset basic control mode (314).

Next, it is determined if there is an active reserve call (402) based on the reserve call state (404). If so, it is determined if the asset effective control mode is either "Independent" or "Schedule" (406). If so, the asset effective control mode is set to "Control" (408). Next it is determined if the asset pool control mode is "Supervision Only" and the asset effective control mode is not "Test" or "Suspended" (410) based on the asset pool control mode (412). If so, the asset effective control mode is set to "Independent" (414). Next, it is determined if the asset pool control mode is "Reserve Relative Only" and the asset effective control mode is "Control" and there is not active reserve call (416). This determination is based upon the reserve call state (404) and the asset pool control mode (412). If so, the asset effective control mode is set to "Independent" (418).

Next, it is determined if the asset pool control mode is "Direct" (502) based upon the asset pool control mode (412). If so, the pool power set point is set to the direct pool power set point (504) based upon the direct pool power set point (506). Next, it is determined if the asset pool control mode is "Schedule" (508) based upon the asset pool control mode (412). If so, the power pool set point is set to a predefined pool energy schedule (510) based upon a predefined pool energy schedule (512). Next, it is determined if the asset pool control mode is "Schedule and Reserve" (514) based upon the asset pool control mode (412). If so, the pool power set point is set to the predefined pool energy schedule and the reserve power amount called (516) based on the predefined pool energy schedule (512) and the reserve power amount called (518).

Next, it is determined if the asset pool control mode is "Schedule and Reserve Relative" or "Reserve Relative Only" and the reserve call is active (602) based upon the asset pool control mode (412) and the reserve call state (604). If so, the pool power set point is set to the actual pool power at the reserve call start and the reserve power amount called (606) based upon the reserve power amount called (518). Next, it is determined if the asset pool control mode is "Schedule and Reserve Relative" and there is no active reserve call (608) based upon the reserve call state (604) and the asset pool control mode (412). If so, the pool power set point is set to the predefined pool energy schedule (610) based upon the predefined pool energy schedule (512). Next, the assets in the pool that have an effective control mode of "Manual" (according to user defined manual set point), "Schedule" (according to the asset's predefined energy schedule), or "Control" (according to set points calculated to meet the overall Pool Power Set Point) are so controlled (612).

Conditions that are considered in determining the "health" of an asset are based on the "Actual process states" in the flow chart 300. The active or inactive reserve call state from a system operator is intended to be the "capacity market call active state" in the flow chart 300. Finally, the "Asset pool control mode" has an influence on the overall pool regulation strategy. With regard to the "Supervision only" pool control mode, this mode is a conventional pool control mode use case, e.g., for renewable assets that shall just be supervised for health (and forecasted for non-control based marketing of energy output). With regard to the "Schedule" pool control mode, this pool control mode is used for energy marketing only (no reserves in addition). The assets are controlled according to a predefined (marketed) pool energy schedule. Having the assets control mode as "Scheduled" leads to the individual assets controlled according to their schedule; having some assets in Independent mode will lead to no control on these assets; having some (or all) of the assets in Control mode leads to compensating pool regulation errors with those assets (avoidance of imbalance energy payments). A typical use case is energy marketing of a mixed pool including renewable with pool power production adherence by compensating renewable forecast errors or unforeseen outages of assets by a subset of regulating assets in the pool.

With regard to the "Schedule and Reserve" pool control mode, this mode is used for energy marketing according to a predefined (marketed) energy schedule and reserve provision, where a spontaneous reserve call adds (or subtracts) on top of the predefined energy schedule. Assets like e.g., renewable energy sources or flexible demands could have a basic control mode of Independent which in case of an active reserve call would be upgraded to "Control". Thus in the absence of a reserve call, system would produce/consume without being controlled according to their nature; in the case of a reserve call, they would contribute to reserve provision (e.g., renewable preferably down; flexible demand preferably up direction by demand reduction). A bidirectional control is possible with all asset types. In the absence of a reserve call, assets in mode "Control" would still be controlled for the sake of energy schedule adherence of the pool.

Regarding the "Schedule and Reserve relative" pool control mode, the asset mix and behavior is the same as in "Schedule and Reserve" with the only difference being that when a reserve call arrives it adds (or subtracts) onto the actual pool power production at that very moment instead of the predefined (marketed) energy schedule. An example use case for this mode is a pool with a great amount of renewable assets and therefore, the pools power production does not have high forecast quality and can very likely deviate significantly from the predefined schedule on occasion. When a reserve call is being issued by the system operator, the operator may want to see the power production change from the actual position, even if this position is far away from the predefined power schedule that has been marketed.

Regarding the "Reserve relative only" pool control mode, this mode is used mainly for renewable assets and flexible demands where the energy schedule adherence is either not relevant or deviations are accepted (e.g., due to a renewable act in certain countries)—but additional money can be earned by providing reserve on demand. In the absence of a reserve call from the system operator, the assets are not controlled at all; only when a reserve call arrives, the reserve call amount adds (or subtracts) on top of the current pool power production at arrival of the call and the assets are controlled as long as the reserve call is active.

Regarding the "Direct" pool control mode, the desired pool power is steered via an external set point value for the pool from an external partner. All assets in the pool having a control mode of "Control" are controlled to comply with the external induced direct pool set point. This use case is applicable when the energy or reserve marketing activity is being done by an external partner that treats the pool as one individual aggregated asset.

Figure 7:
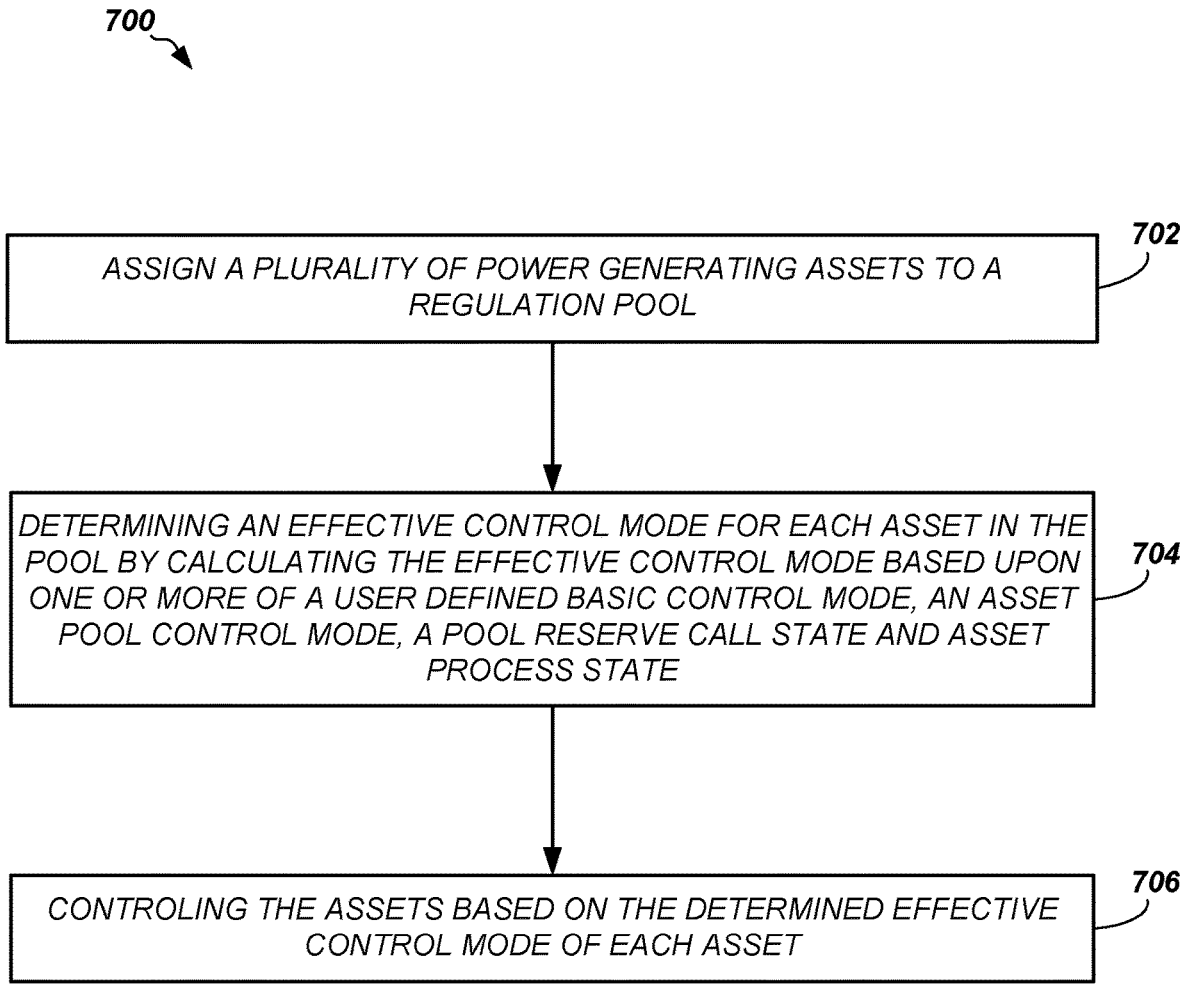
FIG. 7 is a flowchart illustrating an example method of controlling an energy system according to some embodiments.

Turning now to FIG. 7, a flowchart depicting an example method 700 according to embodiments is depicted. The method 700 enables control of a power generation system that includes both fuel-based and renewable generating assets. A plurality of different types of power generating assets are initially assigned to a single regulation pool (702). An effective control mode is then determined for each asset (704). Determining the effective control mode for each asset includes calculating the effective control mode based upon at least one of an asset pool control mode, a reserve call state, actual process states of the assets, and a basic control mode of the assets. The assets are then controlled based on the determined effective control mode of each asset (706).

For example, in some embodiments, the assets may be controlled based on the determined effective control mode of each asset to meet requirements of a plurality of power consuming loads coupled to the power generating assets, to stabilize the frequency of a power grid, to supply reserve power to a market, power grid or ISO, or the like. A power consuming load may include both a load that actively and/or currently consumes power, as well as a load that is reserved for future consumption and/or storage (e.g., as a reserve).

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

Each process (whether called a method, class behavior, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display.

The present disclosure may refer to a "control system", application, or program. A control system, application, or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" generally refers to an energy delivery network. However, in some embodiments, an information or computing network can be used that provides an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for an electricity market, embodiments of the invention can be implemented for other markets.

Accordingly, while the present invention has been disclosed in connection with exemplary embodiments thereof, it should be understood that other embodiments may fall within the spirit and scope of the invention, as defined by the following claims.

What is claimed is:

1. A power generation system comprising:
a plurality of power generating assets, each asset of the plurality of power generating assets having a first control mode, the first control mode defining a default state of the respective asset, wherein the plurality of power generating assets include both fuel-based power generating assets and renewable resource-based power generating assets;
a power transmission network coupling the plurality of power generating assets to loads; and
an energy management system including a controller in communication with the plurality of power generating assets and configured to control operation of the plurality of power generating assets, wherein the controller is operative to:
assign the plurality of power generating assets to a regulation pool having an asset pool control mode;
determine a second control mode for each asset of the plurality of power generating assets based on the respective first control mode, the asset pool control mode, and a reserve call state defining whether a reserve call is active or inactive, an actual process state defining whether the respective asset is healthy, or the reserve call state and the actual process state of the respective asset; and
control the power generating assets of the plurality based on the determined second control modes, respectively.

2. The power generation system of claim 1 wherein the determination of the second control mode for each asset of the plurality of power generating assets comprises determination of the respective second control mode based on the reserve call state defining whether the reserve call is active or inactive.

3. The power generation system of claim 1 wherein the determination of the second control mode for each asset of the plurality of power generating assets comprises determination of the respective second control mode based on the actual process state of the respective asset.

4. The power generation system of claim 1 further comprising an offer scheduling module and an order scheduling module coupled to the controller.

5. The power generation system of claim 4 wherein the energy management system further includes a generation and demand forecast module configured to provide forecast data to the offer scheduling module.

6. The power generation system of claim 1 further comprising a plurality of power consuming loads coupled to the plurality of power generating assets,
wherein the control of the plurality of power generating assets comprises control of the plurality of power generating assets based on the determined second control modes, respective, such that requirements of the power consuming loads are met.

7. The power generation system of claim 1, wherein the determination of the second control mode for each asset of the plurality of power generating assets comprises determination of the respective second control mode based on the respective first control mode, the asset pool control mode, the reserve call state, and the actual process state of the respective asset.

8. A method of controlling a power generation system, the method comprising:
assigning a plurality of power generating assets to a regulation pool having an asset pool control mode, each asset of the plurality of power generating assets having a first control mode, the first control mode defining a default state of the respective asset, wherein the plurality of power generating assets include both fuel-based power generating assets and renewable resource-based power generating assets;
determining a second control mode for each asset of the plurality of power generating assets based on the respective first control mode, and a reserve call state defining whether a reserve call is active or inactive, an actual process state defining whether the respective asset is healthy, or the reserve call state and the actual process state of the respective asset; and
controlling the plurality of power generating assets based on the determined second control modes, respectively, such that requirements of a plurality of power consuming loads coupled to the plurality of power generating assets are met.

9. The method of claim 8 wherein determining the second control mode for each asset of the plurality of power generating assets includes determining the respective second control mode based on the reserve call state defining whether the reserve call is active or inactive.

10. The method of claim 8 wherein determining the second control mode for each asset of the plurality of power generating assets includes determining the respective second control mode based on the actual process state of the respective asset.

11. The method of claim 8 further comprising outputting energy and reserve market offers.

12. The method of claim 11 further comprising receiving energy and reserve market orders.

13. The method of claim 8, wherein determining the second control mode for each asset of the plurality of power generating assets further comprises determining the second control mode for the respective asset based on the asset pool control mode.

14. A controller for a power generation system, the controller comprising:
a processor;
a memory coupled to the processor and storing instructions executable on the processor, the instructions operative to:
assign a plurality of power generating assets to a regulation pool having an asset pool control mode, each asset of the plurality of power generating assets having a first control mode, the first control mode defining a default state of the respective asset, wherein the plurality of power generating assets include both fuel-based power generating assets and renewable resource-based power generating assets;
determine a second control mode for each asset of the plurality of power generating assets based on the respective first control mode, the asset pool control mode, or the respective first control mode and the asset pool control mode, and a reserve call state defining whether a reserve call is active or inactive, an actual process state defining whether the respective asset is healthy, or the reserve call state and the actual process state of the respective asset; and
control the plurality of power generating assets based on the determined second control modes, respectively, such that requirements of a plurality of power consuming loads coupled to the plurality of power generating assets are met.

15. The controller of claim 14 wherein the determination of the second control mode for each asset of the plurality of power generating assets includes determination of the respective second control mode based on a reserve call state defining whether a reserve call is active or inactive.

16. The controller of claim 14 wherein the determination of the second control mode for each asset of the plurality of power generating assets includes determination of the respective second control mode based on an actual process state of the respective asset.

17. The controller of claim 14 wherein the instructions are further operative to output control signals and set points to the plurality of power generating assets.

* * * * *